FABRICATION OF RECORDING HEADS

Filed Nov. 21, 1968

INVENTORS
ROBERT D. FISHER
GEORGE C. PURAM
THOMAS J. TIDD

BY

Frank R. [signature]
AGENT

United States Patent Office 3,605,258
Patented Sept. 20, 1971

3,605,258
FABRICATION OF RECORDING HEADS

Robert D. Fisher, Woodstock, and George C. Puram, Saugerties, N.Y., and Thomas J. Tidd, Springfield, Del., assignors to Ferroxcube Corporation, Saugerties, N.Y.

Filed Nov. 21, 1968, Ser. No. 777,690
Int. Cl. H01f 7/06
U.S. Cl. 29—603 10 Claims

ABSTRACT OF THE DISCLOSURE

A method of assembly and manufacturing micro gap transducing heads with operating gaps for recording or reading in a range from 1 to 150 $\mu$inches and bonded with sputter deposited glass and/or metal gap materials with a high material or head yield including the steps of machining a ferrite bar into a plurality of faced segments separated by grooves, R.F. sputtering a non-magnetic material such as glass or metal on the operating gap face and a metal on the back gap face, bonding a second mating bar to the said bar, and cutting and dicing the bonded bars as desired to form individual pole pieces for subsequent assembly into a transducing head. An alternative method sputter etches away non-desired gap face segments until a desired gap depth is reached, then R.F. sputter depositing a dielectric such as glass onto both faces, then bonding, cutting and dicing.

This invention relates to a method of manufacturing micro gap magnetic transducing heads and more particularly, to a method of manufacturing glass bonded micro gap pole pieces used in the assembly of high frequency recording and/or reproducing heads.

The manufacture of high frequency transducing heads for use in video or digital recording or reproducing is dependent to a large degree, upon the extent to which a small operating gap, usable for reading or recording, is obtainable. It is understood that the term operating gap refers to that used in a transducing operation, such as reading or recording.

Conventional heads employing glass as a filler material for gaps have been proven advantageous in that glass has been found to provide relatively small gap spaces of the order of a few microns. Glass has further advantages in that it serves to bond together the gap facing pole pieces, and additionally possesses a wear characteristic which approximates that of the mating pole pieces. The pole pieces are commonly constructed of a polycrystalline ferrimagnetic material which is pre-formed, sintered and machined into a desired shape. Monocrystalline ferrite materials can also be employed for magnetic heads and these materials can be formed by conventional crystal growing techniques such as flame fusion or the like.

Conventional fabrication of glass bonded heads involves the steps of producing suitable ferrite materials, machining and lapping such materials to form suitable bars which are assembled by glass bonding and then diced and lapped to form the final head pole pieces.

The glass bonding step is crucial in the head assembly in establishing the gap length. A conventional glass bonding method involves the placement of thin fragments of glass, such as a foil or sheet, between the adjoining pole pieces, heating the assembly to the softening point of the glass, applying pressure to the glass to facilitate spreading and allowing the surfaces to cool and the glass to solidify and bond. This method has the disadvantage that complete and uniform coverage of glass is difficult to obtain and that the gap length obtainable is still relatively large for the desired high frequency recording.

In an alternative and more desirable method, capillary action is employed. Here, the pole pieces are pre-formed and placed adjoining one another along the gap faces by the use of shims of desired height. The pieces include a groove or the like adjoining the gap faces and a glass rod is placed in the groove. The assembly is then subjected to suitable pressure and temperature at which point the glass melts and, by capillary action, is drawn into the gap spacing between the pole pieces. The assembly is cooled, allowing the glass to solidify and bond the pole pieces, and then the areas of the assembly containing the shims and groove is cut away. The remaining assembly can then be further diced and machined to form pole pieces of desired shape. This method has the advantage of providing a better coverage of glass, with greater uniformity, over the entire gap face, but suffers from the serious disadvantages of relatively low yield and gap length limitations. Furthermore, the use of shims to define gap length is difficult due to the rather precise tolerance required of the shims, and the manufacture of shims for extremely small gaps in the micro inch range is a very difficult operation. In heads having a back gap either of the foregoing techniques would result in a glass filled back gap having an undesirable high reluctance, due to either the size or length of the back gap or the use therein of the same glass as used in the recording gap or both.

It is therefore the primary object of this invention to provide a novel method of manufacturing a transducing head having an operating gap length in the micro inch range.

It is another object of this invention to provide a novel method of manufacturing a magnetic transducer head with a relatively low reluctance back gap. It is another object of this invention to provide a novel method of manufacturing a magnetic transducer head with a high yield. It is another object of this invention to provide a novel method of manufacturing a magnetic transducer head with uniform gap material deposition. It is another object of this invention to provide a novel method of manufacturing a magnetic transducer head less expensively and more easily than heretofore.

In accordance with the foregoing objects, the present invention provides a novel method of manufacturing a metal and/or glass bonded transducer head. In the inventive method ferrite of a single crystal or polycrystalline structure or other magnetic material suitable for transducing heads is prepared in a conventional shape or bar of desired size. The bar is machined and lapped into a desired configuration, which can be a uniform surface but preferably will include one or a plurality of grooves or channels in a faced portion. The channel separates the surface area into two portions, the operating gap surface (record or playback) and back gap surface. The machined piece is placed into a sputtering chamber of conventional design. A suitable non-magnetic material such as a metal or a dielectric such as a glass of a desired composition is then either D.C. or R.F. sputtered onto the operating gap face portion of the bar to the desired thickness. For the back gap, a second sputtering step deposits a desired material, such as a ferromagnetic or weakly magnetic material to coat the back gap area. Since the back gap material has relatively high permeability with respect to the operating gap, the back gap will have a lower reluctance. In this instance both operating and back gap lengths are the same.

As an alternative method the sputtering operation can be used to precisely etch away a portion of the face of the bar defining the magnetic recording gap area to a depth equal to that of the desired recording gap length less the desired back gap length and then sputter depositing non magnetic material onto the etched area. Subsequently, a non magnetic material is sputter deposited onto the back gap surface area and the previously deposited recording gap surface area to a thickness equivalent to the desired back gap length. The resulting deposited thickness on the back gap surface area and the recording gap surface area is now equal to the desired back gap length and the desired recording gap length.

After the depositions are completed, the bar is mated with an opposing bar and the assembly bonded together by means of a suitable temperature and pressure operation.

The bonded assembly can then be processed as desired, as by cutting, machining, dicing, lapping or polishing and then wiring to form the individual finished recording head pole pieces. In this latter embodiment, since the back gap length is much smaller than the operating gap length, although both employ gap material of the same permeability, the back gap reluctance is less than that of the operating gap.

The foregoing objects, advantages and brief description of the invention will become more apparent from the following more particular descriptions of preferred embodiment employable in effecting the unique method of the present invention as well as from the accompanying drawings, wherein.

Figures 1, 2, 3, 4, 5:
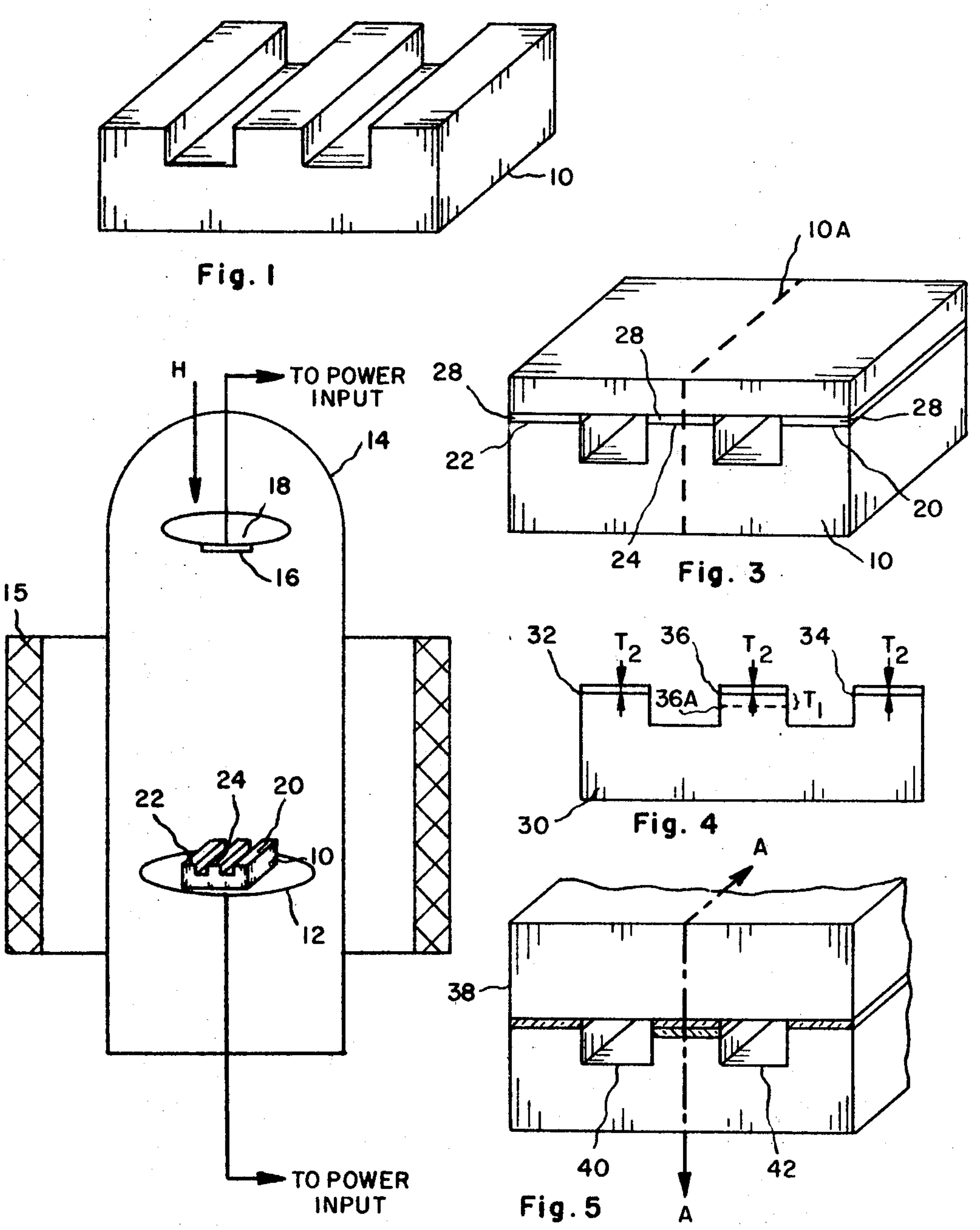
FIG. 1 illustrates a desired block of magnetic material after machining.
FIG. 2 is a diagrammatic illustration of magnetic block material inside an R.F. sputtering chamber.
FIG. 3 illustrates a block assembly.
FIG. 4 illustrates an alternative block.
FIG. 5 illustrates a completed assembly of the alternative block.

Although magnetic heads can be constructed from a variety of materials, this invention in the main is concerned with the manufacture of glass or metal bonded ferrite heads. The glass sputtering technique, applied herein, employs a proces known as R.F. sputtering.

Briefly stated, R.F. sputtering is a thin film deposition technique employing charge mobility in an ionized gas. The process can best be described by visualizing a closed chamber having two discs suspended in argon at a pressure below atmospheric. The argon is ionized by the application of a potential applied across the discs. In the R.F. sputtering technique, one of the discs is connected to the output of an R.F. generator and the other to a reference point such as ground.

The ungrounded plate serves as the cathode, for reasons which are explained below, and the grounded disc becomes the anode. If the R.F. voltage is high enough (several hundred volts or higher) and the other conditions are correct, a glow discharge will occur between plates.

Since the potential of the cathode alternates between positive and negative with respect to the anode, the cathode is alternately bombarded by electrons and positive ions during each R.F. cycle. But the important property, namely, rapid sputtering of the cathode, does not occur until a blocking capacitor is placed in a series with the cathode to allow a self-bias to develop.

With the capacitor, generation of a self bias occurs rapidly and can be explained in the following way. The charged particles which are generated in the R.F. glow discharge described above have significantly different mobilities. In the typical case of sputtering in pure argon, the particles are electrons and singly-charged positive argon ions. Since the mobility of the particles is proprotional to the mass, the mobility of the electrons is approximately $10^5$ greater than the mobility of the argon ions. During each cycle more electrons than argon ions are collected on the cathode. Since none of these trapped charges can leave the electrode through the blocking capacitor, electrons accumulate on the electrode.

This negative charge is necessary to repel the highly mobile electrons and to establish an equilibrium between the incident argon ions and electrons. The effect is the same as biasing the electrode with an external power supply at a D.C. level which is negative with respect to the plasma potential (approximately ground). The R.F. voltage now swings above and below a D.C. level which is automatically maintained to equalize the electron and ion current to the electrode. In this condition the cathode surface sputters rapidly with the sputtering material depositing on the anode and other surfaces in the vacuum enclosure.

The alternative technique, D.C. sputtering is more conventional and will not be described in detail, except to note that the D.C. sputter technique finds application in the metal sputtering field. For further detail, note the Symposium on Deposition of Thin Films by Sputtering, University of Rochester, June 1966 and June 1967.

Turning now to the head assembly of this invention, a bar, which may be polycrystalline, or monocrystalline or manufactured of sintered oxidic ferrimagnetic material by standard techniques, is preferably machined to a channeled configuration such as is shown in FIG. 1 and designated with the legend 10. A flat unbroken surface could be used also, however the grooved surface has certain advantages which will become evident. A suitable ferrite which can be employed is manganese zinc ferrite in either polycrystalline or single crystal form, and may have a composition of: $Fe_2O_3$, 52.5 mol percent; MnO, 29 mol percent; and ZnO, 18.5 mol percent. Other ranges and materials are also within the scope of this invention including, but not limited to, the presence of other additives such as copper, barium, lithium, manganese or nickel.

The shaped bar 10 is then placed on the anode 12 of an R.F. sputtering chamber 14, illustrated in FIG. 2. The chamber includes a suitable means such as a magnetic coil 15 for applying a field H along the axis of the chamber. The anode serves as a deposition collection electrode for sputtered materials. A nonmagnetic material 16 of suitable composition is placed on the target electrode, the cathode 18, and serves as the target material. The target material may be dielectric such as glass having a composition which has a demonstrated wear characteristic similar to that of the ferrite. For example, the glass material can be Pyrex 7740 (Corning Glass Corp.) or a glass of the following composition: PbO 60%, $SiO_2$ 16%, $B_2O_3$ 14% and ZnO 10% by weight.

In the particular embodiment to be described, the sputtering temperature was that of ambient or room temperature and the electrodes forming the anode and cathode were circular and six inches in diameter. The sputtering gas was argon. The power input was 650 watts and the target material a Pyrex glass identified as Corning Glass No. 7740. The pressure was maintained at 4 millitorr. The R.F. power frequency was 13.56 mc. and a magnetic field H was applied of the order of 100 gauss. The cathode-anode spacing was 1¼ inches.

The bar is provided with three raised and faced areas 20, 22, 24. Areas 20 and 22 can represent the back gap and 24 the operating or recording gap, but the reverse can also be designated. Also the bar can contain only one area, or as many as practical.

Prior to deposition areas 20 and 22 may be masked by any standard masking technique. Glass is then deposited on area 24 until a desired thickness is reached which will ultimately define the desired gap length. As is well known, the R.F. sputtering technique allows insulators such as glass to be deposited with a high degree of coating uniformity and a precise deposition thickness. The area 24 can be deposited with glass to a thickness of from anywhere between 1 $\mu$inch to 150 $\mu$inches but, by way of example, a thickness of 40 $\mu$inches can be deposited for defining an operating gap length.

Next, area 24 is masked and subsequently a suitable high permeability material is then deposited for the ultimate formation of a low reluctance back gap. Such a material, by way of example, can be magnetic such as nickel, iron, cobalt and their alloys, or a mu metal, or a nonmagnetic material such as glass containing a dispersion of magnetic particles. A specifically exemplary material such as a nickel-iron alloy known as Permalloy can be employed. The deposition thickness of the low reluctance back gap is similar to the recording gap and the deposition surfaces are substantially coplanar. Because of the ease of depositing various magnetic materials by the sputtering technique, low reluctance back gaps are easily obtainable. This latter operation, where metals are deposited, can employ either the R.F. or D.C. sputtering technique. The sputtering technique allows extremely accurate deposition thickness which is important in order to obtain even or coplanar surfaces between the spaced depositions.

The bar is then removed and a mating bar 26, shown in FIG. 3, is placed on the deposited areas. The assembly is then subjected to a temperature and pressure suitable for bonding the bars via the interspaced gap materials 28. For example, if Pyrex and Permalloy are used respectively for the recording gap and back gap, a temperature in the area of 800° C.–900° C., for example, 850° C. and pressure of the order of 500 to 600 p.s.i. may be utilized. The assembly is then cooled and the bonded bars are removed for subsequent cutting and machining. The block assembly in FIG. 3 can be cut along the line 10A for forming two complete transducing heads.

The assembly is machined and diced in the form of the individual pieces desired and electrical windings placed on the pieces within the preformed grooves or by means of a U-shaped core member bridging the pieces.

This process represents two distinct advantages over present or conventional head manufacturing procedures in that the reluctance in the back gaps are now considerably reduced since a magnetic material with a relatively high permeability (>1) is now present whereas in conventional processes the back gap containing the same material as the operating gap, has a permeability of one, representing a relatively high reluctance. Further, the process described decreases the materials cost in that it is now possible to form heads with all the material effectively utilized rather than half the material discarded as in the conventional glass bonding method. The process provides a controllable, more precise and smaller gap length which present methods simply cannot provide by utilizing a separate shim, and provides a high yield of manufacture with an option to dice or cut through either the back gap or operating gap to form the individual pole pieces.

The foregoing process can be modified somewhat to further improve the inventive method to advantage over conventional head fabrication and represent a further means of attaining improved head fabrication procedures. The following process may be utilized under circumstances wherein the back gaps are formed by glass or other non-magnetic material but the reluctance is relatively low due to the fact that the back gap, when formed, is represented by a vary small micro gap (<5 micro inches) which is significantly smaller than that formed by any conventional processes. Therefore, the reluctance is obviously less.

In the modified process, a suitably prepared ferrimagnetic bar 30 having the configuration such as is shown in FIG. 4 is placed on the target electrode or cathode of the R.F. sputtering chamber. The bar 30 is provided with a channelled configuration 30 with area 32 and 34 representing back gap areas and area 36 representing the operating gap or conversely area 36 representing the back gap and areas 32 and 34 representing operating gap areas.

The back gap area 34 and 32 is masked by conventional masking techniques. The operating gap area 36 is then sputter etched to a desired depth 36–A equal to the desired operating gap length less the desired back gap length.

The bar 30 is then placed on the collection electrode or anode and a suitable target material such as a glass as described previously is placed on the cathode. The areas 32 and 34 are masked and the sputtered glass deposits on the operating gap surface 36 until it reaches a thickness T′ equal to the previously etched depth. The areas 32 and 34 are then unmasked. The glass is then deposited on the back gap area 32 and 24 as well as operating gap surface 36, to the same thickness $T_2$, thereby maintaining all three glass surfaces coplanar.

A mating piece 38 is then placed on the coplanar glass surface. The assembly is bonded by subjecting to a heat and pressure of suitable values, in the same manner as previously described.

The assembly can then be sliced, along line A—A as shown in FIG. 5, through the operating gap area or conversely if the foregoing process were carried out in a complementary fashion, through the back gap area to form two complete, individual pole piece assemblies 38. The individual pole pieces are formed by dicing the pole piece assemblies. The channels 40 and 42 are provided to accommodate excitation windings.

A typical head which can be formed having a recording gap length of 40 μinches, a back gap length of 4 μinches and an actual size of about 0.125″ by 0.125″ by 0.01″.

While the invention has been described and shown with reference to certain preferred embodiments thereof, it will be understood by those skilled in the art that the foregoing and other changes in form and details may be made therein without departing from the spirit and scope of the invention.

What is claimed is:

1. A process for manufacturing a plurality of micro gap magnetic transducing heads comprising the steps of forming a bar of magnetic material with a channel in the surface thereof, thereby defining an operating gap surface and a back gap surface, placing said bar on the anode of an R.F. sputtering chamber with said back gap surface masked, placing a target of glass material on the cathode of said R.F. sputtering chamber, impressing an R.F. potential across said electrodes for depositing said target glass to a desired thickness on the unmasked operating gap surface, unmasking said back gap surface and masking the deposited operating gap surface, replacing said target of glass material with a target of relatively high permeability material, sputter depositing said relatively high permeability material on said back gap surface to a thickness sufficient to render the surface thereof substantially coplanar with said deposited operating gap surface, removing said operating gap surface mask, placing a mating bar atop the coplanar deposited operating and back gap surfaces and bridging said channel, subjecting the assembly to heat and pressure sufficient to allow the operating and back gap deposited materials to soften, cooling the assembly to allow said materials to harden and thereby bond together the bars, and processing the resultant assembly to form the finished heads.

2. The process of claim 1 wherein said magnetic material is manganese zinc ferrite and said glass material possesses a wear characteristic similar to that of the ferrite.

3. The process of claim 1 wherein said back gap material is metallic.

4. The process of claim 1 wherein said glass is Pyrex and said softening temperature is between 800° C.–900° C. and said pressure is of the order of 500–600 p.s.i.

5. A process for manufacturing a plurality of micro gap magnetic transducer heads comprising the steps of forming a bar of magnetic material with an operating gap surface area and a back gap surface area, placing said bar with said back gap surface masked on the target electrode of a sputtering chamber, activating said chamber and sputter etching the surface of said operating gap away until a desired depth is attained relative to said back gap surface, placing said bar on the deposition collection electrode of said chamber with said back gap surface masked, placing a non-magnetic target material on the target electrode of said sputtering chamber, activating said chamber and selectively sputter depositing said target material to a thickness equal to the depth of the sputter etching of said operating gap surface, unmasking said back gap surface, sputter depositing said non-magnetic material on all of said surfaces to the desired thickness of the back gap, said latter deposition maintaining a coplanar relationship among all said surfaces, placing a mating bar atop the deposited surfaces, subjecting the assembly to heat and pressure sufficient to allow said non-magnetic material to soften, cooling the assembly to allow said glass to harden and thereby bond together the bars, and processing the resultant assembly to form the finished head.

6. The process of claim 5 wherein said magnetic material is manganese zinc ferrite.

7. The process of claim 5 wherein said target non-magnetic material is glass.

8. A process for manufacturing a plurality of micro gap magnetic transducer heads comprising the steps of forming a bar of magnetic material with a plurality of channels therein defining an operating gap surface and a pair of back gap surfaces, placing said bar on the target electrode of sputtering chamber, activating said chamber and sputter etching the surface of said operating gap away until a desired depth is attained relative to said back gap surfaces, placing said bar on the anode of an R.F. sputtering chamber with said back gap surfaces masked, placing a target of glass material on the cathode of said R.F. sputtering chamber, impressing an R.F. potential across said electrodes for depositing said target glass to a thickness equal to the previously etched depth on the unmasked operating gap surface, unmasking said back gap surfaces, sputter depositing said glass material on all of said surfaces to a thickness equal to the desired back gap length, all of said deposited glass material surfaces being maintained substantially coplanar with said deposited glass, placing a mating bar atop the coplanar glass surfaces and bridging said channels, subjecting the assembly to heat and pressure sufficient to allow said glass to soften, cooling the assembly to allow said glass to harden and thereby bond together the bars, dividing said block between said channels along said operating gap and processing the resultant assembly to form the finished heads.

9. The process of claim 8 wherein said magnetic material is manganese zinc ferrite and said glass material possesses a wear characteristic similar to that of the ferrite.

10. The process of claim 8 wherein said glass is Pyrex.

References Cited

UNITED STATES PATENTS

| | | | |
|---|---|---|---|
| 3,104,455 | 9/1963 | Frost | 29—603 |
| 3,458,926 | 8/1969 | Maissel et al. | 29—603 |
| 3,479,738 | 11/1969 | Hanak | 29—603 |
| 3,480,935 | 11/1969 | Springer | 179—100.2X |
| 3,508,014 | 4/1970 | Mersing | 79—100.2 |

JOHN F. CAMPBELL, Primary Examiner

C. E. HALL, Assistant Examiner

U.S. Cl. X.R.

179—100.2C